Patented Nov. 8, 1938

2,136,131

UNITED STATES PATENT OFFICE 2,136,131

DISTEMPER VACCINE AND METHOD OF PREPARING THE SAME

Robert G. Green, Minneapolis, Minn.

No Drawing. Application March 9, 1937, Serial No. 129,955

6 Claims. (Cl. 167—78)

The distemper virus discovered by Carré and extensively investigated by Laidlaw and Dunkin, generally is believed to be the sole cause of canine distemper in dogs, foxes, and other susceptible animals, and has been widely distributed and extensively used for the production of vaccines, serums and materials for diagnosis.

An object of the present invention is the preparation, from the virus of canine distemper, of a modified virus or vaccine for use in the immunization of foxes and dogs against distemper. The principal desirable properties of such a vaccine are that it shall be safe to use and produce a high degree of immunity in the animals treated.

I have discovered that by passing the filterable virus of Carré, e. g. commercially available distemper virus, such as the so-called Laidlaw-Dunkin virus or a virus obtained in the usual and well-known manner from an animal such as a fox having natural distemper, serially through ferrets, it may be so modified or its nature changed that it safely may be administered in the living state. The virus is so changed in nature by each generation or passage through a ferret that after a serial passage of a sufficiently large number of generations it is found to have gradually lost its pathogenic properties for foxes and dogs and instead of severe or fatal infections it produces only mild infections, clinically dissimilar to typical distemper and with a low mortality rate, and the animals which have been inoculated with the modified virus are rendered immune to typical distemper.

The serial transmission through ferrets is accomplished by inoculating a ferret with active distemper virus and when the ferret sickens or dies using infected tissue from it to infect another ferret and so on for a sufficient number of generations to produce the desired degree of modification of the virus. By actual test it has been found that after from 5 to 10 generations the original virus has been slightly but definitely modified and its ability to produce typical distemper in foxes definitely reduced. After 20 generations the modified virus or vaccine usually produces no demonstrable symptoms of distemper in foxes, tested in groups of as many as ten. Regardless of the number of generations, within reasonable limits infection of foxes with the resulting vaccine results in immunity to typical distemper.

Specifically, commercial dog distemper virus injected into foxes was found to produce a mortality of about 60%, whereas after about 10 generations of the virus serially through ferrets the resulting vaccine was found to produce a mortality of only about 30% and those animals dying succumbed suddenly after about 14 days without showing the typical symptoms of distemper excepting for a few hours before death.

As the number of generations is increased the mortality rate due to the use of the vaccine decreases until at about 30 generations the mortality rate is only about 3%. By employing a larger number of generations and by employing other expedients such as the use of the resulting modified virus in attenuated form produced, for instance, by drying or other known or usual method of attenuation, or by the use of the modified virus or vaccine with serum, the mortality rate may be reduced to a negligible figure.

In a typical instance the serial passage of the virus through ferrets was accomplished by first injecting 1 cc. of a 5% spleen emulsion from a fox which had died of typical distemper into a plurality of ferrets. These ferrets sickened and were killed on the 12th day after the inoculation and their spleens used in the preparation of a 5% emulsion, 1 cc. of which was injected into another group of ferrets. This procedure was continued for the desired number of generations, the vaccine produced at each 5 generations being tested for its effect on foxes.

A combined vaccine and serum treatment preferred for use on young animals, both foxes and dogs, on account of their lower natural resistance, consists in simultaneously injecting the animal with a suitable dose, say 1 cc. of a 5% spleen emulsion containing the modified virus and a suitable dose, say 10 cc. of standard antiserum. This simultaneous injection is followed at intervals of between one and two weeks with one or more further injections of the modified virus or vaccine alone until complete immunity against typical distemper has been established.

The serum for use in the foregoing treatment may be prepared by standard procedure, e. g. by giving immune dogs or foxes several injections of virus at suitable intervals and using the blood of the animal for the preparation of the serum.

It is observed that the preparation of the distemper vaccine described above is analogous to the known preparation of vaccine for smallpox in which virulent virus of human smallpox is modified and rendered innocuous by serial passage through calves or rabbits. Not all viruses, however, are capable of being modified in this manner and one cannot predict this property in a virus or predetermine what animal will serve for the modification. Moreover, it was not predictable that the serum treatment described above would exert a protective effect by simultaneous injection in an animal inoculated with the modified virus or vaccine.

The modified virus produced in accordance with the present invention may be used in the known manner or in accordance with well established practice for the production of vaccines, serums and materials for diagnosis and may be used in a variety of ways. The invention embraces the modification of the virus by any number of passages, two or more, through ferrets, and the resulting products.

I claim:

1. Method of modifying distemper virus for the production of a vaccine capable when injected into foxes of immunizing the same against typical distemper which comprises passing the virus of typical canine distemper serially through ferrets for a sufficient number of passages to materially reduce the normal distemper death rate of foxes injected therewith.

2. Method of modifying distemper virus for the production of a vaccine capable when injected into foxes of immunizing the same against typical distemper which comprises passing the virus of typical canine distemper for at least ten generations serially through ferrets.

3. Method of modifying distemper virus for the production of a vaccine capable when injected into foxes of immunizing the same against typical distemper which comprises passing the virus of typical canine distemper for at least thirty generations serially through ferrets.

4. A distemper vaccine comprising distemper virus modified by serial passage through ferrets for a sufficient number of passages to materially reduce the normal distemper death rate of foxes injected therewith, said vaccine being capable of immunizing foxes against typical canine distemper.

5. A distemper vaccine comprising distemper virus modified by serial passage for at least about ten generations through ferrets, said vaccine being capable of immunizing foxes against typical canine distemper.

6. A distemper vaccine comprising distemper virus modified by serial passage for at least about thirty generations through ferrets, said vaccine being capable of immunizing foxes against typical canine distemper.

ROBERT G. GREEN.